Nov. 12, 1963 P. R. ADAMS ETAL 3,110,187
GYROSCOPE

Filed March 10, 1959 2 Sheets-Sheet 1

INVENTORS.
PAUL R. ADAMS
GERALD B. SPEEN
BY DONALD E. BRANNON

ATTORNEY

Nov. 12, 1963 P. R. ADAMS ETAL 3,110,187
GYROSCOPE
Filed March 10, 1959 2 Sheets-Sheet 2
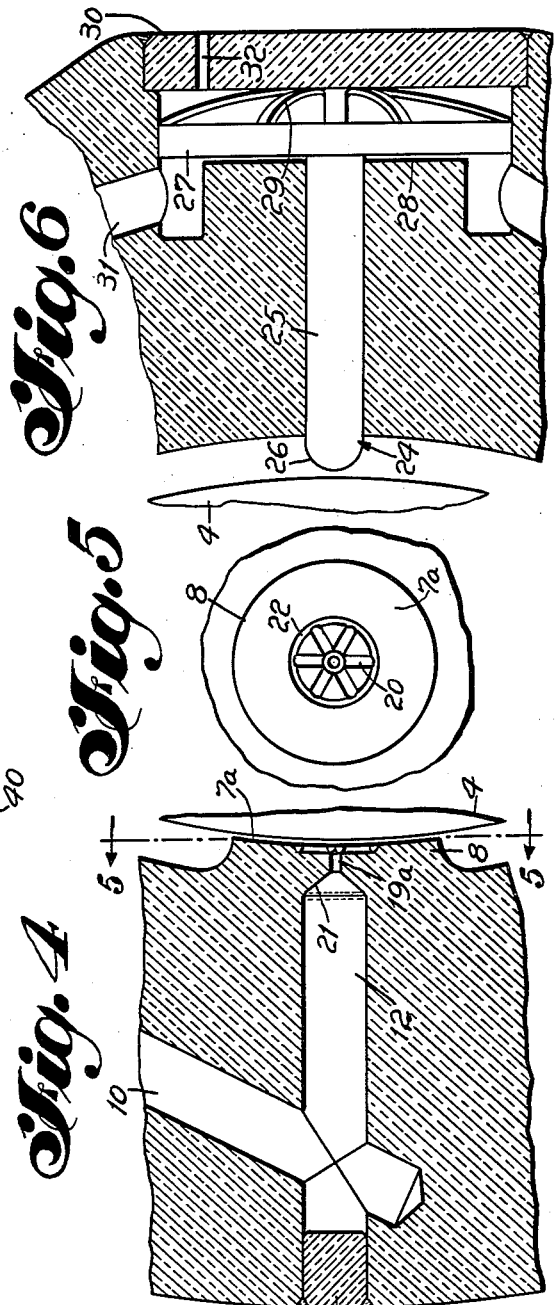
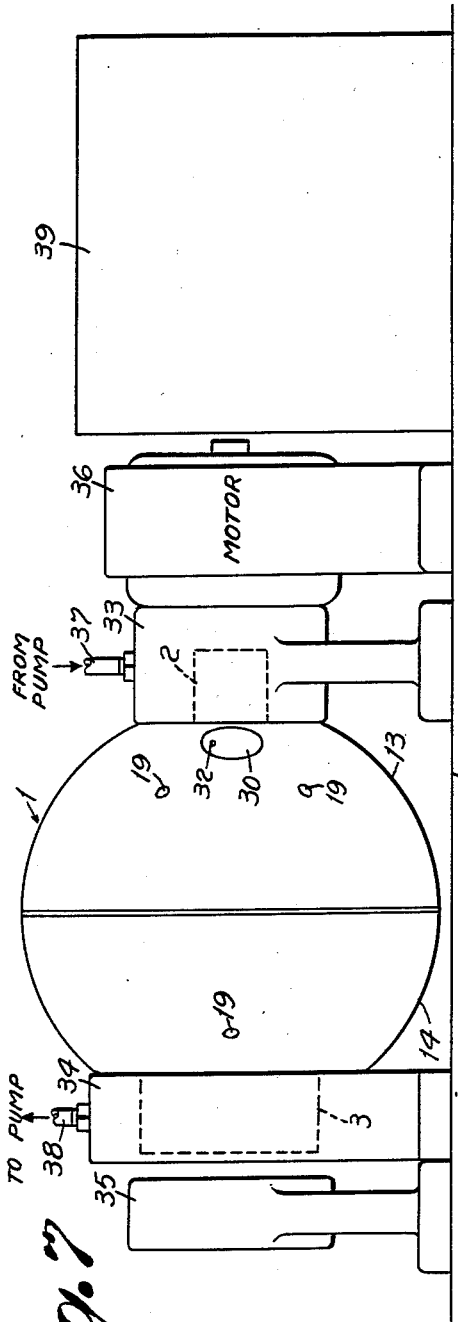
INVENTORS.
PAUL R. ADAMS
GERALD B. SPEEN
DONALD E. BRANNON
BY
ATTORNEY

3,110,187
GYROSCOPE

Paul R. Adams, Bethesda, Md., and Gerald Bruce Speen, Sepulveda, and Donald Edgar Brannon, San Fernando, Calif., assignors to International Telephone and Telegraph Corporation, Nutley, N.J., a corporation of Maryland
Filed Mar. 10, 1959, Ser. No. 798,556
8 Claims. (Cl. 74—5.1)

This invention relates to improvements in high accurate, low drift gyroscopes and in particular to what may be called the "boot-strap" type of gyroscope, that is, any type whose drift decreases nearly to zero if the main frame thereof is maintained in nearly perfect alignment with the rotor axis.

In the copending application of P. R. Adams-G. B. Speen-C. C. Miller, Jr., Serial No. 663,290, filed June 3, 1957, now Patent Number 2,940,318, a new type of gyroscope is disclosed which provides a "rotor swiveling arrangement" which makes use of gas bearings in order to take advantage of the very low static friction characteristic of such gas bearings and which at the same time avoids the error ordinarily resulting from the "bias torque" or unbalance steady state torque generally characteristic of such bearings. By rotor swiveling arrangement is meant broadly any supporting means whether in the form of conventional gimbals or an internal Hooke's joint, or any form which supports the rotor from the main frame while still permitting at least two degrees of freedom of tilt of the rotor axis with respect to the main frame. A moderate degree of vacuum is maintained around those parts which undergo relative motion as a result of the swiveling action, thereby greatly reducing the gaseous damping of the swiveling action. The drift rate of this gyroscope decreases almost without limit as the angle between the rotor axis and the corresponding axis of the gyroscope main frame is reduced towards zero, thus making it possible to achieve almost limitless system accuracy merely by providing a sufficiently perfect platform alignment system to maintain the platform in alignment with the gyroscope rotor to an extremely high degree of precision. Further, this gyroscope inherently lends itself to completely or approximately isoelastic configurations. The gas bearing gyroscope has a spherical member supported by four or more separate bearing pads or feeds so as to provide three complete degrees of rotational freedom. The gas bearing employed is characterized by self-servoing action in all bearing pads and by complete isolation of each pad from the pressure variations in adjacent pads.

It is an object of this invention to provide an improvement in a gas bearing gyroscope for supporting the spherical rotor during such time as the gyroscope is not operative so that the rotor will not touch the bearing pads.

It is a further object of this invention to provide improved means within the trunnion bearings and the frame of the gyroscope for the intake and exhausting of the gas.

The gyroscope of this invention comprises a frame, a rotor, and means rotatably disposing the rotor within the frame, including a plurality of gas bearings. The rotor has bearing surface areas disposed in coactive association with each gas bearing, the axis of each gas bearing being disposed in coincidence with the corresponding perpendicular line to a surface of an imaginary regular polyhedron which passes through the center of the polyhedron, and has means associated with the frame to supply gas to the bearings. An improvement feature is the provision of a plurality of members for statically supporting the rotor from the frame.

A further feature is that the plurality of members which statically support the rotor from the frame comprises a plurality of fixed members and a plurality of movable members, the fixed members being preferably disposed on one side of the rotor in generally opposed relation to the movable members disposed on the opposite side of the rotor.

Another feature is that the frame has a plurality of openings and each movable member is disposed within an opening with a portion of the movable member protruding into the inner space of the frame for contact with the rotor. A cap secures the movable member within the opening and resilient means disposed in the opening between the cap and the movable member urge the movable member inwardly toward the rotor. Means are also provided in the frame for feeding gas to the movable member so that the pressure of the gas together with the centrifugal force exerted on the frame when the gyroscope is in operation will overcome a portion of the force exerted by the resilient means to thereby force the movable member away from the rotor and thus allow the rotor to be freely supported only by the gas bearings.

The above-mentioned and other features and objects of this invention will become more apparent by reference to the following description taken in conjunction with the accompanying drawings, in which:

FIG. 4 is an enlarged view of one of the gas bearing pads shown in cross section in FIG. 2;

FIG. 5 is a plan view of the gas bearing pad of FIG. 4;

FIG. 6 is an enlarged view of a movable caging plug shown in cross section in FIG. 2; and FIG. 7 is a schematic diagram of a gyroscope stabilized system using the gyroscope of this invention.

Figure 1:
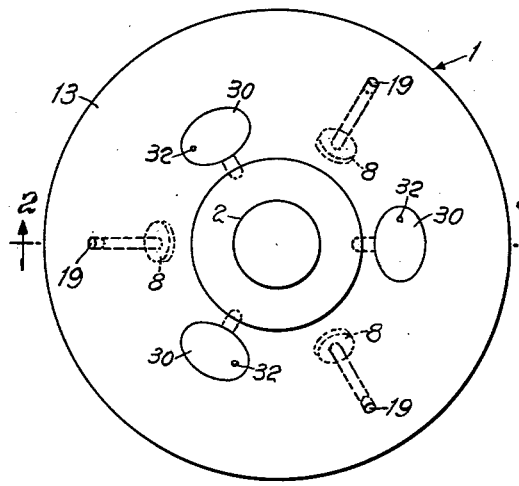
FIG. 1 is a view of the gyroscope looking in the direction of the rotation axis from the motor side of the gyroscope as viewed in FIG. 7.
Figure 3:
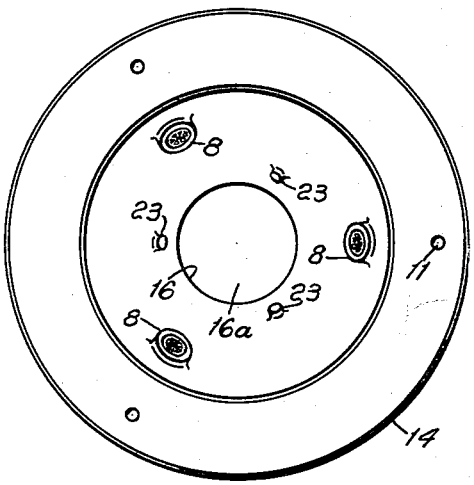
FIG. 3 is a cross-sectional view along line 3—3 of FIG. 2.
Figure 2:
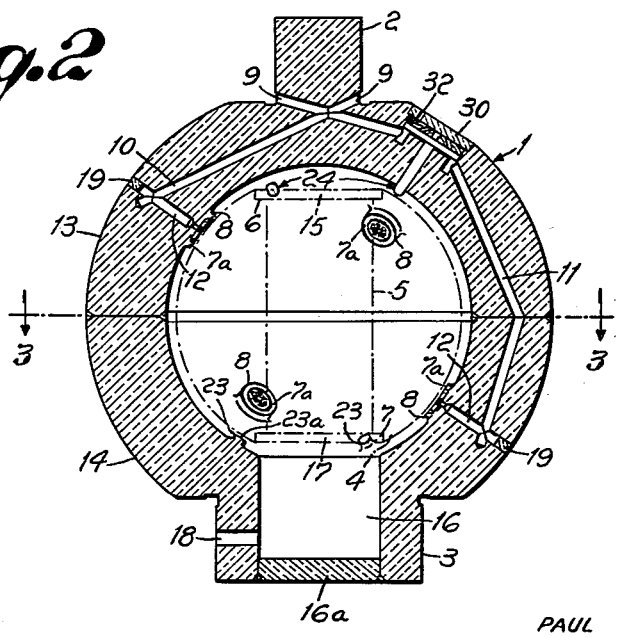
FIG. 2 is a cross-sectional view along the line 2—2 of FIG. 1.

Referring to FIGS. 1, 2 and 3, there is shown an outer intermediate frame 1 spherical in shape and having cylindrical end portions 2 and 3 for bearing supports. Interiorly of the intermediate frame 1 is disposed a spherical rotor 4, shown in broken lines, constructed preferably of a highly stable material such as quartz or some other very high density material and preferably hollow to obtain optimum momentum for the mass used. In the embodiment shown, there is provided a cylindrical cavity 5 extending throughout the rotor 4 and connecting cylindrical end cavities 6 and 7 of larger diameter than the cavity 5, thus giving the rotor a predetermined axis of rotation about which its moment of inertia is maximum. The cavity 5 is preferably made so that its diameter is approximately one third the diameter of the rotor 4. The rotor 4 has a very accurate spherical external form and a very high quality exterior finish so that it can act as a bearing surface cooperating with the accurate spherical end surface 7a of the gas bearing pads 8. In the figures there are shown six gas bearing pads 8 which are of cylindrical form extending inwardly from the inside of the intermediate frame 1 so that their concave end surfaces match with the spherical surface of the rotor 4. These bearing pads 8 are disposed along three orthogonal axes. Three of them are integral with half of the intermediate frame 4 and the other three are integral with the other half of this frame. Gas under high pressure is admitted through ports 9 in the cylindrical end portion 2 and are conducted through manifold passages 10 and 11 to the interior chamber 12 within the gas bearing 8. The intermediate frame 1 is constructed in two halves 13 and 14 about the equator denoted by the line 3—3. For pickoff purposes there is provided an optical flat mirror 15 disposed in the cavity 6 and a cylindrical cavity 16 in the cylindrical end portion 13 which is sealed by a transparent disk 16a to prevent gas escaping from the interior of the intermediate frame and to allow transmission of a light beam from a light source outside the frame 1 and the reflected light beam from the mirror 15 in the cavity 6. A transparent balancing disk 17, which has similar properties both in weight and mass distribution as the mirror in the cavity 6, is placed within the cavity 7 to properly balance the weight of the mirror in the cavity 6. The gas which passes into the interior frame of the intermediate frame from the gas bearings 8 is then conducted out at low pressure through the port 18 in the cylindrical end portion 3.

With reference to FIGS. 4 and 5, there is shown in detail the construction of the bearing pad 8. The supply chamber 12 or duct is supplied with high pressure gas by means of the passages 10 or 11. The chamber is sealed off by means of a plug 19. A restrictor or feed hole 19a of much smaller diameter than the supply chamber 12 connects the radial grooves 20 on the surface 7a with the supply chamber 12. In this case six radial grooves are shown, though it is to be understood that more or less may be provided. The tapered surface 21 provides a gradual transition from the chamber 12 to the restrictor hole 19a to avoid abrupt changes in duct size that would cause resistance to gas flow. The restrictor hole 19a and the supply duct 12 are disposed axially in the center of the bearing pad 8.

An annular or circular groove 22 concentric with the feed hole 19a connects the ends of the radial grooves 20. This feed arrangement is designed to distribute the gas over a wide periphery so that its velocity can be much less than one tenth of Mach 1 while at the same time minimizing the volume of the distribution cavity in order to reduce instability. This arrangement prevents the gas from rushing into the bearing space at a speed which may attain Mach 1 or more and cause serious asymmetry of the flow thereby creating torques incapable of being balanced out or cancelled. For optimum results, the radial grooves 20 that feed the circular groove 22 should be made about 1.4 times as wide as the circular groove. Maximum efficiency of gas flow is achieved when the cross sectional area of the radial and circular grooves have a semielliptical shape with depth and maximum width roughly equal, though it is to be understood that the rectangular and triangular cross sections are also advantageous to insure very little pressure drop between the feed hole 19a and the circular groove 22.

To properly support the rotor during such times as the gyroscope is not operating, a caging mechanism is provided. The caging mechanism prevents damage to the rotor surface by the bearing pads during handling, shipping and installation when high pressure gas is not being supplied to the bearing pads 8; it secures the rotor to the intermediate frame so that it is possible to bring the rotor quickly to operating speed and also prevents tumbling of the rotor when the rotation of the rotor becomes too low. The caging mechanism consists of three fixed plugs 23 and three movable plugs 24. It is to be understood that more or fewer plugs may be used as desired to accomplish the same purpose. The fixed plugs are disposed in one half 14 of the intermediate frame 1 and the movable plugs are disposed in the other half 13 of the movable frame. Ideally they would be disposed along the orthogonal axes as is done with the bearing pads 8 but obviously set apart from the axes of the bearing pads. However, it is not necessary to place the caging plugs in this manner and it is preferable to place the caging plugs either nearer to the equator of the intermediate frame or farther away from this equator than the bearing pads so that their points of contact on the rotor will be outside of the zone of engagement of the bearing pads on the rotor. The caging plugs are preferably located close to the axis of rotation. Thus if for some reason the plugs should mar the surface of the rotor 4, the bearing pads will not act over this area, and therefore, no error will be caused. The fixed plugs 23 may be made of quartz, the same material of the rotor, and as shown in FIG. 2 in this embodiment consist of a cylindrical bump protruding from the inner wall of the frame 1. It is preferred to make the fixed plugs 23 integral with the inside of the intermediate frame through this is a matter of manufacturing design and procedure. In any case the fixed plugs must be extremely rigidly and precisely located with respect to the intermediate frame. The caging bumps are made slightly longer than the bearing pads 8 so that when the rotor touches these bumps, it will not rest on the bearing pads. In accordance with one feature of the present invention this excess height of the caging bumps is achieved without interfering with the optical grinding procedures used to accurately form the concave ends of the bearing pads by initially making this height equal to or lower than the pads, and later building up this height with metal, preferably by plating. Preferably the bumps are initially made lower than the nearly-finished bearing pads, are then metalized by the usual spraying or evaporating processes but thinly enough to still be lower than the bearing pads. The bearing pads are then optically refinished to correct any distortions caused by the metalizing heat. Finally, the bumps are further built up a few tens of millionths of an inch by electroplating with a hard metal. The movable plug 24 shown in more detail in FIG. 6 consists of a relatively long cylindrical portion 25 having a smoothly rounded end 26 and a relatively large diameter portion 27 at the opposite end. The plug 24 is inserted through the cavity 28 with the portion 25 protruding into the interior of intermediate frame 1. A spider spring 29 is placed on top of the portion 27 and a cap 30 secures the caging plug 24 and spring 29 in their proper location. When the gyroscope is not operating, it is apparent that the spring 29 will urge the plug 24 inwardly against the rotor 4 and act to push the rotor against the fixed plugs. The fixed plugs may have a metal coating on the contact end 23a to prevent adhesion to the rotor and to minimize marring or scratching thereof as well as to facilitate manufacture as above mentioned. The movable plugs may have plastic tips to prevent any marring of the rotor surface. The passage 31 feeds gas against the lower surface of the portion 27 and the gas will pass through the cavity 28 into the passage 11 from whence it is distributed to the bearing pads 8 of the other half of the frame 1. In the operation of the gyroscope the rotor is first secured to the plugs. When the gas under high pressure is introduced into the gyroscope and the gyroscope picks up speed, at a certain speed the combination of the gas pressure against the surface of the plug 24 combined with the centrifugal force exerted by the spinning gyroscope will exert a force on the springs outwardly that will free the rotor from the caging plugs. The rotor will then be freely suspended within the intermediate frame 1 supported only by the gas issuing from the bearing pads 8 and rotate within the frame with at least two degrees of freedom. A relief hole 32 is provided in the cap 30 so that any gas leaking around the portion 27 can escape and in this way a differential pressure between the underside of the caging plug and the exhaust pressure outside will be maintained. This differential pressure will be sufficient to force caging plug back as necessary.

In FIG. 7 is shown a system utilizing the gas bearing gyroscope. The gyroscope is supported by means of bearing portions 2 and 3 in trunnion-bearing journals 33 and 34 the details of which are shown in Patent Number 2,940,318. A pick-off system 35 is disposed adjacent the end of the cylindrical bearing 3 for the sensing of angular deviations in the spinning gyroscope. A motor 36 is coupled to the shaft 2 of the gyroscope for spinning the gyroscope. It is to be understood, however, that other means may be used to drive the frame 1, such as, turbines driven by the gas. The trunnion bearing 33 provides means for coupling the high pressure gas supply from the pump (not shown) to the gyroscope by means of tube 37. The exhausted gas is removed from the frame through the trunnion bearing 34 of tube 38 and fed back to the pump. The navigation equipment, such as accelerometers and other devices used in inertial guidance, may be disposed in the box 39. The whole assembly is mounted on an inertial platform 40 which is properly gimbaled (gimbal system not shown).

While we have described above the principles of our invention in connection with specific apparatus, it is to be clearly understood that this description is made only by way of example and not as a limitation to the scope of our invention as set forth in the objects thereof and in the accompanying claims.

We claim:

1. A gyroscope comprising a hollow sphere, a plurality of trunnion-bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, said movable members being disposed in a plurality of openings in said hollow sphere, a resilient member disposed in each said opening for urging said movable member inwardly towards said rotor, one of said trunnion bearings having input means to allow the entrance of gas into said hollow sphere, said hollow sphere having passages disposed therein to permit the passage of said gas from said input means to said gas bearings and to said opening to urge said movable member in combination with the centrifugal force exerted by said hollow sphere when rotating outwardly away from said rotor in opposition to the force exerted by said resilient members thereby allowing said rotor to rotate freely within said hollow sphere supported only by said gas bearings, and another of said trunnion bearings having a passage therethrough to allow the exhausted gas from said gas bearings to escape from said hollow sphere.

2. A gyroscope comprising a hollow sphere, a plurality of trunnion bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, each said fixed members comprising a cylindrical body carried by the inner wall of said hollow sphere, the end of said body adjacent said rotor having a smooth surface and the hardness of said end surface is less than the surface hardness of said rotor, said movable members being disposed in a plurality of openings in said hollow sphere, a resilient member disposed in each said opening for urging said movable member inwardly towards said rotor, one of said trunnion bearings having input means to allow the entrance of gas into said hollow sphere, said hollow sphere having passages disposed therein to permit the passage of said gas from said input means to said gas bearings and to said opening to urge said movable member in combination with the centrifugal force exerted by said hollow sphere when rotating outwardly away from said rotor in opposition to the force exerted by said resilient member thereby allowing said rotor to rotate freely within said hollow sphere supported only by said gas bearings, and another of said trunnion bearings having a passage therethrough to allow the exhausted gas from said gas bearings to escape from said hollow sphere.

3. A gyroscope comprising a hollow sphere, a plurality of trunnion bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, each said fixed members comprising a cylindrical body carried by the inner wall of said hollow sphere, the end of said body adjacent said rotor having a smooth surface and the hardness of said end surface is less than the surface hardness of said rotor, said movable members being disposed in a plurality of openings in said hollow sphere, a cap disposed in closure relation in said opening, a resilient member disposed in said opening between said cap and said movable member for urging said movable member inwardly towards said rotor, one of said trunnion bearings having input means to allow the entrance of gas into said hollow sphere, said hollow sphere having passages disposed therein to permit the passage of said gas from said input means to said gas bearings and to said opening to urge said movable member in combination with the centrifugal force exerted by said hollow sphere when rotating outwardly away from said rotor in opposition to the force exerted by said resilient member thereby allowing said rotor to rotate freely within said hollow sphere supported only by said gas bearings, another of said trunnion bearings having a passage therethrough to allow the exhausted gas from said frame to said gas bearings to escape from said frame, and said cap having an opening therethrough to permit the escape of gas from the space between said movable member and said cap.

4. A gyroscope comprising a hollow sphere, a plurality of trunnion bearings supporting said hollow sphere for rotation, a rotor in the form of a sphere, means disposing said rotor within said hollotw sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, each said fixed members comprising a cylindrical body carried by the inner wall of said hollow sphere, the end of said body adjacent said rotor having a smooth surface and the hardness of said end surface is less than the surface hardness of said rotor, each said movable member having a long cylindrical portion with a smoothly rounded end and a relatively large diameter portion at the opposite end, said movable members being disposed in a plurality of openings in said hollow sphere, each said opening having a large cavity on the outside surface of said sphere and a relatively narrow passage opening into the inside of said sphere, said long cylindrical portion lying in said narrow passage with the smoothly rounded end protruding into the inner space of said hollow sphere for contact with said rotor and said large diameter portion being disposed in said large cavity, a cap disposed in closure relation in said large cavity, a resilient member disposed in said large cavity between said cap and said large diameter portion for urging said movable member inwardly towards said rotor, one of said trunnion bearings having input means to allow the entrance of gas into said hollow sphere, said hollow sphere having passages disposed therein to permit the passage of said gas from said input means to said gas bearings and to said large cavity to urge said movable member in combination with the centrifugal force exerted by said hollow sphere when rotating outwardly away from said rotor in opposition to the force exerted by said resilient member thereby allowing said rotor to rotate freely within said hollow sphere supported by said gas bearings, another trunnion bearing having a passage therethrough to allow the exhausted gas from said gas bearings to escape from said hollow sphere, and said cap having an opening therethrough to permit the escape of gas from the space between said large diameter portion of said cap.

5. A gyroscope comprising a hollow sphere, a plurality of trunnion-bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane.

6. A gyroscope comprising a hollow sphere, a plurality of trunnion-bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, said movable members having means to resiliently urge said member towards rotor supporting position.

7. A gyroscope comprising a hollow sphere, a plurality of trunnion-bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, said movable members having means to resiliently urge said member towards rotor supporting position, and means to apply gas to said movable members in opposition to said resilient means when gas is supplied to said gas bearings.

8. A gyroscope comprising a hollow sphere, a plurality of trunnion-bearings supporting said hollow sphere for rotation, a rotor in the form of a sphere, means disposing said rotor within said hollow sphere, said disposing means including a plurality of gas bearings for rotatably supporting said rotor relative said hollow sphere, said rotor having bearing surface areas disposed in coactive association with said gas bearings, a plurality of members for statically supporting said rotor from structural engagement with said hollow sphere, said plurality of members comprising a plurality of fixed members and a plurality of movable members, said fixed members being disposed on one side of an equatorial plane dividing said hollow sphere and said rotor sphere each into two equal portions and said movable members being disposed on the opposite side of said equatorial plane, said movable members being disposed in a plurality of openings in said hollow sphere, a resilient member disposed in each said opening for urging said movable member inwardly towards said rotor, and means to apply gas to said movable members in opposition to said resilient members when gas is supplied to said gas bearings.

References Cited in the file of this patent
UNITED STATES PATENTS

| | | |
|---|---|---|
| 2,578,713 | Martellotti | Dec. 18, 1951 |
| 2,695,198 | Brugger | Nov. 23, 1954 |
| 2,710,234 | Hansen | June 7, 1955 |
| 2,873,683 | Sherwood | Feb. 17, 1959 |